US 9,558,431 B2

(12) United States Patent
Nagatoshi et al.

(10) Patent No.: US 9,558,431 B2
(45) Date of Patent: Jan. 31, 2017

(54) OPTICAL SCANNING APPARATUS

(71) Applicant: CANON KABUSHIKI KAISHA, Tokyo (JP)

(72) Inventors: Jun Nagatoshi, Tokyo (JP); Mitsuhiro Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/040,386

(22) Filed: Feb. 10, 2016

(65) Prior Publication Data
US 2016/0239730 A1  Aug. 18, 2016

(30) Foreign Application Priority Data

Feb. 17, 2015 (JP) .................................. 2015-028946

(51) Int. Cl.
| | |
|---|---|
| *G02B 26/12* | (2006.01) |
| *B41J 2/435* | (2006.01) |
| *G06K 15/12* | (2006.01) |
| *H04N 1/06* | (2006.01) |
| *H04N 1/113* | (2006.01) |
| *G06K 7/10* | (2006.01) |
| *B41J 2/47* | (2006.01) |
| *G02B 27/00* | (2006.01) |
| *G02B 7/00* | (2006.01) |

(52) U.S. Cl.
CPC ................ *G06K 15/12* (2013.01); *B41J 2/471* (2013.01); *G02B 7/00* (2013.01); *G02B 26/12* (2013.01); *G02B 27/0006* (2013.01); *G06K 7/10613* (2013.01); *G06K 7/10623* (2013.01); *H04N 1/06* (2013.01); *H04N 1/113* (2013.01)

(58) Field of Classification Search
CPC ....... G02B 27/0006; G02B 26/12; G02B 7/00; B41J 2/471; G06K 7/10613; G06K 7/10623
See application file for complete search history.

(56) References Cited

U.S. PATENT DOCUMENTS

| | | | | |
|---|---|---|---|---|
| 2006/0285188 A1* | 12/2006 | Tahk | .................... | G02B 26/121 |
| | | | | 359/216.1 |
| 2010/0091083 A1* | 4/2010 | Itami | ........................ | B41J 2/471 |
| | | | | 347/261 |
| 2014/0354757 A1* | 12/2014 | Narita | ..................... | B41J 2/471 |
| | | | | 347/261 |

FOREIGN PATENT DOCUMENTS

| | | |
|---|---|---|
| JP | 5-341221 A | 12/1993 |
| JP | 9-211369 A | 8/1997 |
| JP | 2010-60769 A | 3/2010 |
| JP | 2013-114100 A | 6/2013 |

* cited by examiner

*Primary Examiner* — Julian Huffman
(74) *Attorney, Agent, or Firm* — Canon USA, Inc. I.P. Division

(57) ABSTRACT

An optical scanning apparatus includes an optical box having a top surface that is constituted by a single lid. A first surface of the top surface is disposed closer to a rotary polygon mirror than a second surface and is disposed closer to a bottom surface of the optical box than an edge portion of a light deflector positioned farthest from the bottom surface. A third surface of a convex portion of the top surface is positioned farther from the bottom surface than the first surface. A lower edge portion of the convex portion is disposed outside a circumscribed circle of the rotary polygon mirror.

7 Claims, 9 Drawing Sheets

OPTICAL SCANNING APPARATUS

BACKGROUND OF THE INVENTION

Field of the Invention

The present invention relates to an optical scanning apparatus that includes a light deflector.

Description of the Related Art

As discussed in Japanese Patent Application Laid-Open No 2013-114100, an image forming apparatus (e.g., a laser beam printer, a digital copying machine, or a digital FAX) can be configured to include an optical scanning apparatus that can perform optical writing with a laser beam. Many of the optical scanning apparatuses include an optical box that supports a plurality of optical components, including a light deflector. The optical box includes an aperture through which the laser beam can pass.

According to the configuration discussed in Japanese Patent Application Laid-Open No. 2013-114100, there will be a possibility that toner particles, paper powder, and aerial dust may enter the optical box via a through-hole of the optical box or a clearance between the optical box and a lid. If a polygon mirror serving as the light deflector rotates at a higher speed in this case, fine particles will adhere to an edge portion of each reflection surface in a main scanning direction. FIG. 8 illustrates a polygon mirror to which fine particles have adhered. When the polygon mirror 4 rotates in a clockwise (CW) direction (seen from the above) indicated by an arrow A, a negative pressure is generated on the left side of each reflection surface 12 and therefore fine particles are dragged toward the left side. As a result, the fine particles adhere to a range Y1. Further, a positive pressure is generated on the right side of each reflection surface 12 and fine particles are struck onto the reflection surface 12. As a result, the fine particles adhere to a range Y2. In FIGS. 8, H1 and H2 indicate deflection positions of a laser beam concentrated on the reflection surface of the polygon mirror toward a sub scanning direction. The deflection position shifts from the position H1 to the position H2 when the polygon mirror rotates. The light beam deflected in the vicinity of the position H1 forms an image in the vicinity of a writing start point of an image region. The light beam deflected in the vicinity of the position H2 forms an image in the vicinity of a writing finish point of the image region. Therefore, the fine particles having adhered to the range Y1 undesirably reduces the quantity of light in the vicinity of the writing start point of the image region. The fine particles having adhered to the range Y2 reduces the quantity of light in the vicinity of the writing finish point of the image region. The reduction in reflection rate at both edge portions of each reflection surface 12 causes a significant amount of unevenness in the image density.

SUMMARY OF THE INVENTION

The present invention is directed to a technique capable of preventing fine particles from adhering to a surface of a polygon mirror.

According to an aspect of the present invention, an optical scanning apparatus according to the present invention includes a light deflector that includes a rotary polygon mirror and is configured to deflect a light beam emitted from a light source and an optical box that includes a bottom surface that supports the light deflector and a top surface that faces the bottom surface, wherein the optical box includes an aperture through which the light beam reflected by the light deflector can be emitted. The top surface of the optical box is constituted by a single lid. The top surface includes a first surface and a second surface provided at different positions in a direction from the aperture to the rotary polygon mirror. The first surface is disposed closer to the rotary polygon mirror than the second surface is in the direction from the aperture to the rotary polygon mirror. The first surface is disposed closer to the rotary polygon mirror than the second surface is in a rotation axis direction of the rotary polygon mirror and is disposed closer to the bottom surface than an edge portion of the light deflector positioned farthest from the bottom surface is. The top surface of the optical box includes a convex portion that is provided at the same position as the rotary polygon mirror in the direction from the aperture to the rotary polygon mirror in such a way as to protrude in a direction far from the bottom surface in the rotation axis direction of the rotary polygon mirror. A third surface of the convex portion located at a remotest position from the bottom surface is positioned farther from the bottom surface than the first surface is in the rotation axis direction of the rotary polygon mirror. Further, a lower edge portion of the convex portion that is closer to the rotary polygon mirror is disposed outside a circumscribed circle of the rotary polygon mirror.

Further features of the present invention will become apparent from the following description of exemplary embodiments with reference to the attached drawings.

DESCRIPTION OF THE EMBODIMENTS

[Image Forming Apparatus]

Figure 1:
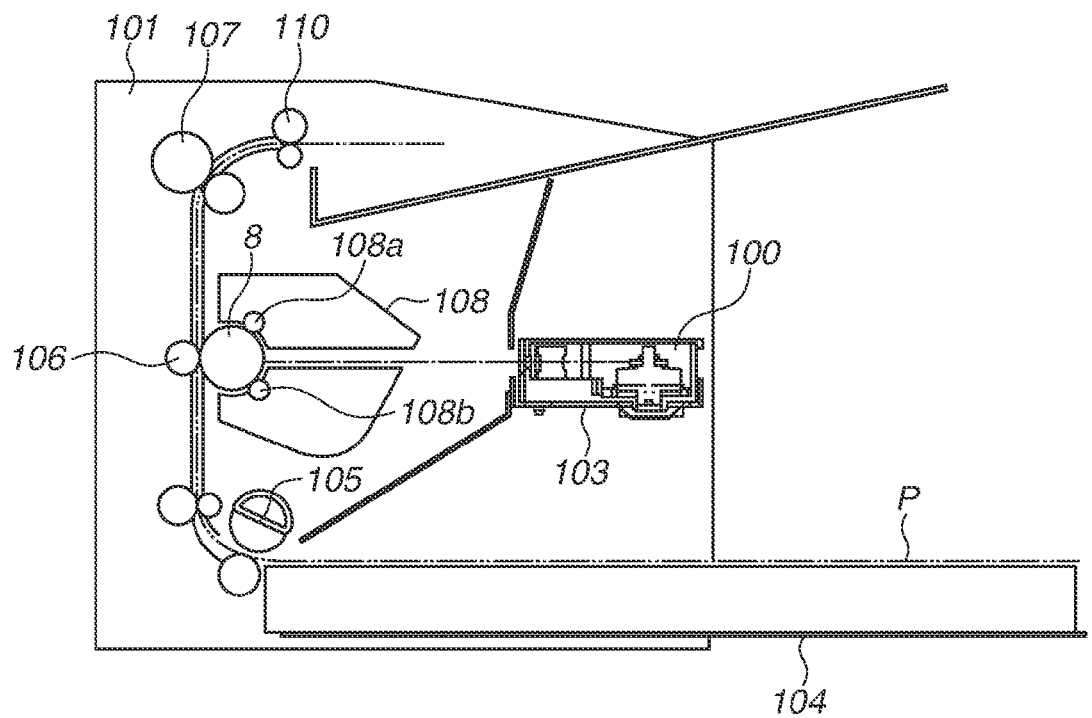
FIG. 1 is a cross-sectional view schematically illustrating an image forming apparatus.

FIG. 1 illustrates an image forming apparatus 101. An optical scanning apparatus 100 (described below) is installed on an optical bench 103. The optical bench 103 is a part of the housing for the image forming apparatus 101. The image forming apparatus 101 includes a process cartridge 108 serving as an image forming unit, a paper feeding unit 104 in which a transfer member P is placed, a paper feeding roller 105, a transfer roller (i.e., a transfer unit) 106, and a fixing device (i.e., a fixing unit) 107. The process cartridge 108 includes a photosensitive drum (i.e., a photosensitive member) 8 serving as an image bearing member, a charging roller 108a, and a developing roller 108b. The transfer roller 106 and the photosensitive drum 8 are in contact with each other to form a transfer nip portion.

The charging roller 108a charges a surface of the photosensitive drum 8 while the photosensitive drum 8 rotates around a rotation axis thereof. Then, the optical scanning apparatus 100 emits a laser beam toward the photosensitive drum 8 for performing scanning in such a way as to form a latent image on the surface of the photosensitive drum 8. Subsequently, the developing roller 108b causes toner particles to adhere to the surface of the photosensitive drum 8. Thus, by developing the latent image with the toner particles, a toner image can be formed.

On the other hand, the paper feeding roller 105 feeds the transfer member P from the paper feeding unit 104. The transfer roller 106 transfers the toner image from the photosensitive drum 8 to the transfer member P. Subsequently, the fixing device 107 applies heat and pressure to the transfer member P to fix the toner image on the transfer member P. A paper discharge roller 110 outputs the transfer member P, on which the toner particles are fixed, to the outside of the image forming apparatus 101.

[Optical Scanning Apparatus]

Figure 2:
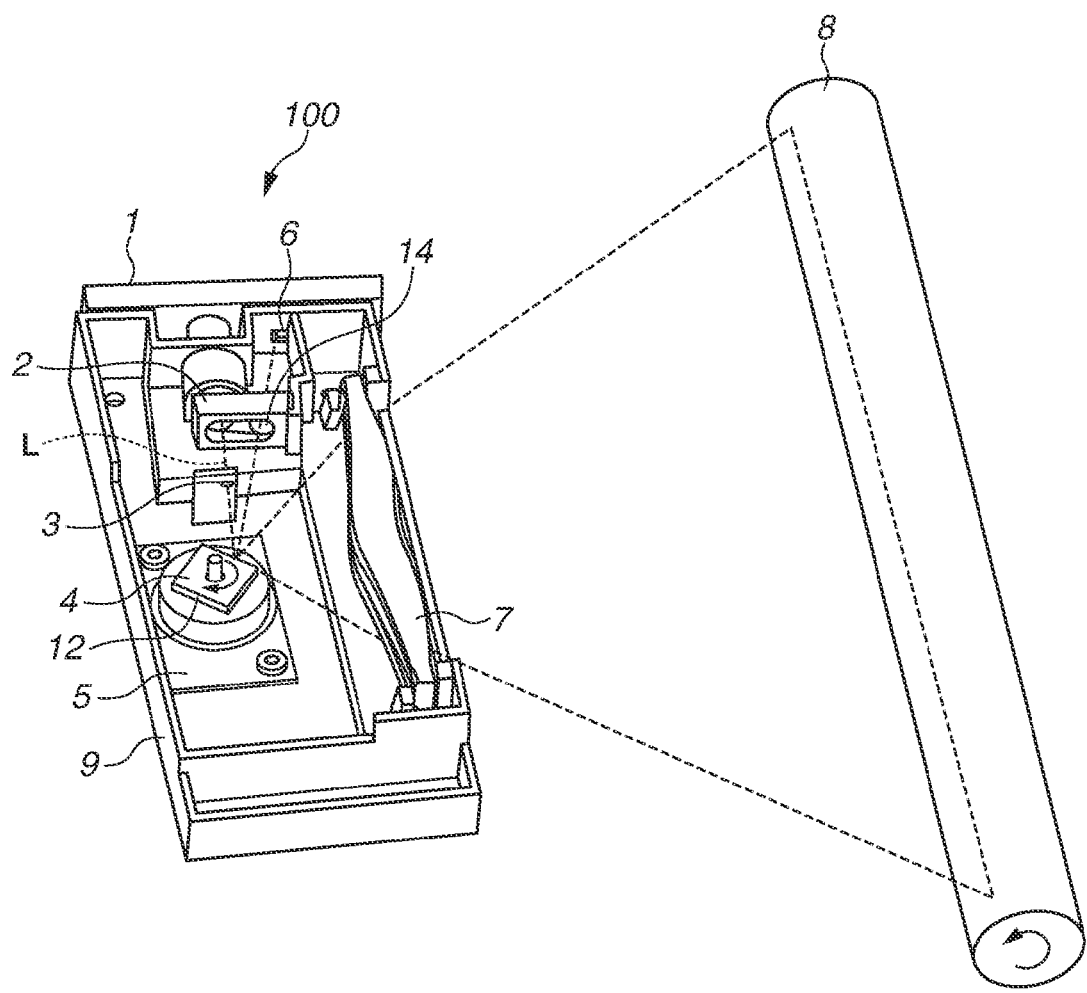
FIG. 2 is a perspective view illustrating an optical scanning apparatus.
Figure 9:
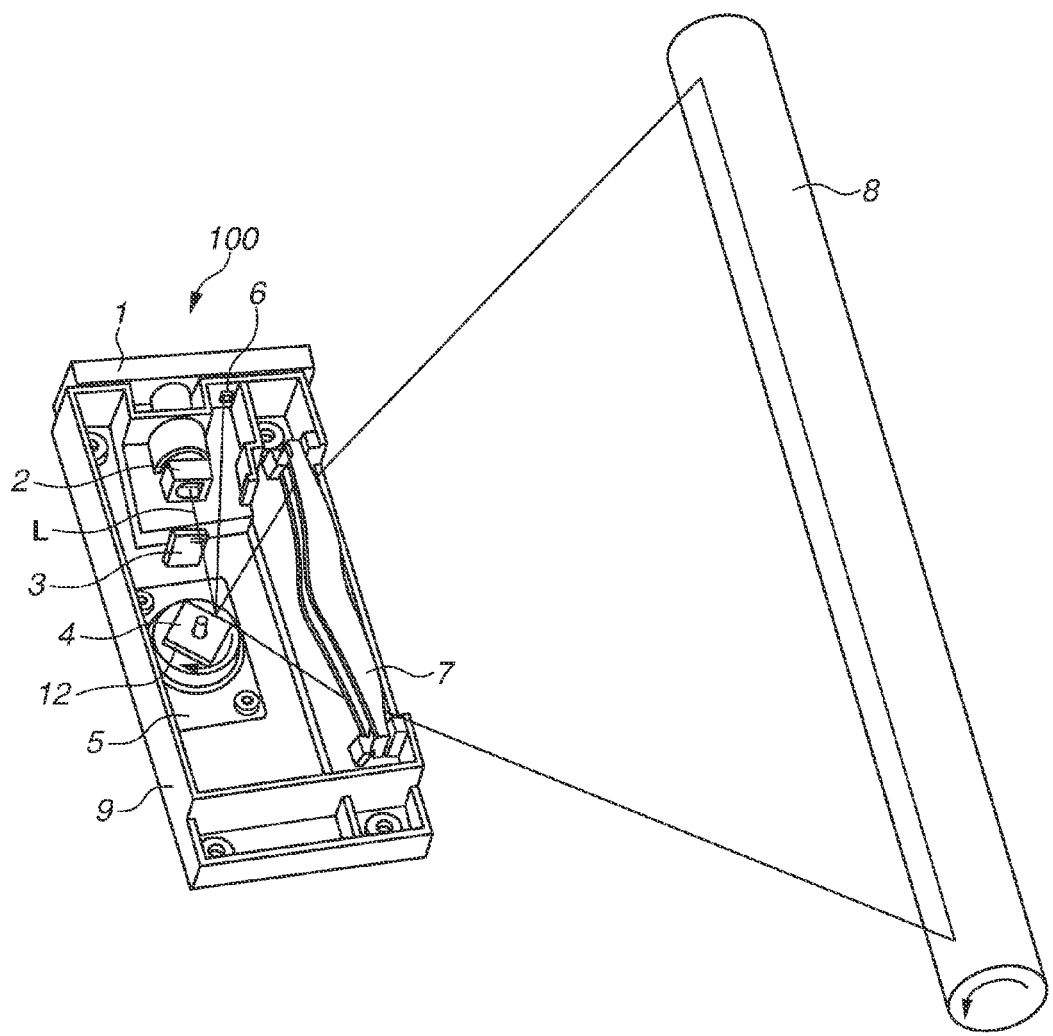
FIG. 9 is a perspective view illustrating another configuration of the optical scanning apparatus.

Next, the optical scanning apparatus 100 will be described in detail below. FIG. 2 is a perspective view schematically illustrating the optical scanning apparatus 100. A semiconductor laser unit 1 includes a semiconductor laser 1a (not illustrated) serving as a light source that can emit a laser beam L and an associated driving circuit 1b, which are integrated together. The laser beam L emitted from the semiconductor laser 1a passes through a lens 2, which has a collimator lens function and a cylindrical lens function, and an aperture stop 3 and then reaches one of a plurality of reflection surfaces 12 formed on a rotary polygon mirror 4 of a light deflector 5. The polygon mirror 4 is configured to rotate in a direction indicated by an arrow when the polygon mirror 4 is driven by a motor provided in the light deflector 5. The polygon mirror 4 deflects the laser beam L. The advancing direction of the laser beam L deflected on the reflection surface 12 is variable depending on the rotation of the polygon mirror 4. When the polygon mirror 4 is positioned at a predetermined rotation phase, the laser beam L reflected by the reflection surface 12 passes through a BD (beam detector) lens portion 14 and enters a light receiving portion of a BD sensor 6. Further, when the polygon mirror 4 is positioned at another rotation phase, the laser beam L enters an fθ lens 7 (i.e., a scanning lens) 7 and passes through an aperture O1 formed between a box member 9 and a lid member 20. Then, the laser beam L reaches a photosensitive surface (i.e., a scanned surface), which is the surface of the photosensitive drum 8. The above-mentioned optical members (i.e., the semiconductor laser unit 1, the lens 2, the aperture stop 3, the light deflector 5, the BD sensor 6, and the fθ lens 7) are positioned in the box member 9, and supported and fixed to the box member 9. The box member 9 and the lid member 20 cooperatively function as an optical box that positions and supports the above-mentioned optical members. FIG. 9 illustrates another configuration of the optical scanning apparatus 100, which does not include the BD lens portion 14. According to the arrangement illustrated in FIG. 9, the laser beam L reflected by the reflection surface 12 can directly enter the light receiving portion of the BD sensor 6 without passing through the BD lens portion 14.

Next, a method for scanning the photosensitive drum 8 with a laser beam, which can be performed by the optical scanning apparatus 100, will be described in detail below. When the laser beam L emitted from the semiconductor laser of the semiconductor laser unit 1 passes through the lens 2, the laser beam L is converted into substantially parallel light or converged light in the main scanning direction and converted into converged light in the sub scanning direction. Next, when the laser beam L passes through the aperture stop 3, the beam width thereof is limited. The laser beam L forms a focal-line image extending in the main scanning direction on the reflection surface 12 of the polygon mirror 4. The reflection direction of the laser beam L on the reflection surface 12 continuously changes according to the rotation of the polygon mirror 4. In other words, the polygon mirror 4 deflects the laser beam L. When the polygon mirror 4 is positioned at a predetermined rotation phase, the reflected laser beam L passes through the BD lens portion 14 and enters the light receiving portion 10 of the BD sensor 6. The BD sensor 6 outputs a BD signal based on the quantity of light received by the light receiving portion (not illustrated). Then, light emission start (i.e., image writing) timing of the light source is determined based on image data, with reference to the output timing of the BD signal.

When the polygon mirror 4 further rotates by a predetermined amount, the reflected laser beam L passes through the fθ lens 7 and reaches the surface of the photosensitive drum 8. The fθ lens 7 concentrates the laser beam L and forms a spot image on surface of the photosensitive drum 8. Until the polygon mirror 4 further rotates by a predetermined amount after the laser beam L starts entering the fθ lens 7, the laser beam L continuously passes through the fθ lens 7 and reaches the surface of the photosensitive drum 8. The spot image of the laser beam L moves in the scanning direction that corresponds to the rotational direction of the polygon mirror 4. The scanning direction is parallel to a rotation axis direction of the photosensitive drum 8. In designing the fθ lens 7, an image-forming position of the laser beam L is taken into consideration, so that the spot image of the laser beam L moves at a constant speed in the scanning direction on the surface of the photosensitive drum 8.

While the spot image of the laser beam L moves in the scanning direction on the surface of the photosensitive drum 8, driving current is supplied to the light source of the semiconductor laser unit 1 based on a laser driving signal (i.e., a VIDEO signal) corresponding to image data to be formed. Therefore, the light source is turned on. A latent image corresponding to the image data can be formed in the scanning direction while the scanning operation is performed with the laser beam L (in the main scanning direction).

In addition to the above-mentioned rotation of the polygon mirror motor 4, when the photosensitive drum 8 rotates around the rotation axis thereof, the spot image of the laser beam L relatively moves in the sub scanning (i.e., a direction perpendicular to the main scanning direction) on the photosensitive drum surface 8. While the scanning operation is performed with the laser beam L in the state where the polygon mirror 4 and the photosensitive drum 8 rotate in the above-mentioned manner, a two-dimensional latent image corresponding to the image data can be formed on the surface of the photosensitive drum 8. The above-mentioned processes of outputting the BD signal and subsequently performing scanning on the photosensitive drum 8 with the laser beam L are performed according to the rotation of the polygon mirror 4 for each reflection surface 12.

[Configuration of Lid Member 20]

Figure 3:
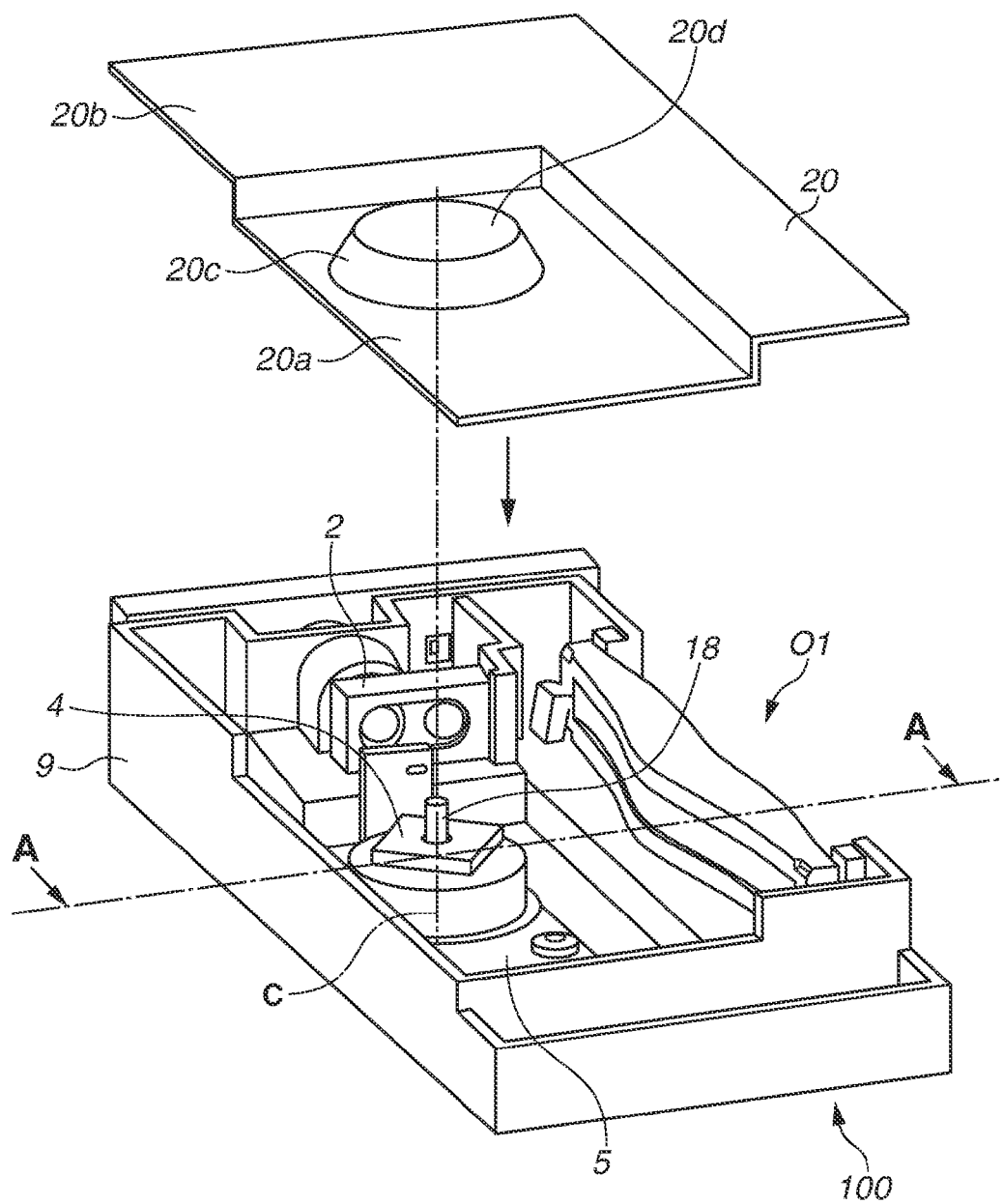
FIG. 3 is a perspective view illustrating the optical scanning apparatus.

FIG. 3 illustrates an assembling of the lid member 20 with the box member 9. The lid member 20 includes a peripheral part 20a, which is positioned above the light deflector 5. The peripheral part 20a is positioned lower than a remaining portion 20b. The lid member 20 further includes a convex portion 20c, which is positioned adjacent to the upper part of the light deflector 5. The convex portion 20c has a truncated cone shape, which is concentric with a rotational shaft 18 to which the polygon mirror 4 of the light deflector 5 is fixed. A part of the convex portion 20c that faces the rotary polygon mirror 4 is referred to as a counter portion 20d. The peripheral part (i.e. a first surface) 20a, the remaining portion (i.e., a second surface) 20b, and the counter portion (i.e., a third surface) 20d of the lid member 20 cooperatively constitute a top surface of the optical box that faces a bottom surface 9a of the box member 9. The peripheral part 20a is provided around the counter portion 20d. When the lid member 20 is assembled with the box member 9, the internal optical members including the composite anamorphic collimator lens 2 and the polygon mirror 4 can be hermetically sealed.

Figure 4:
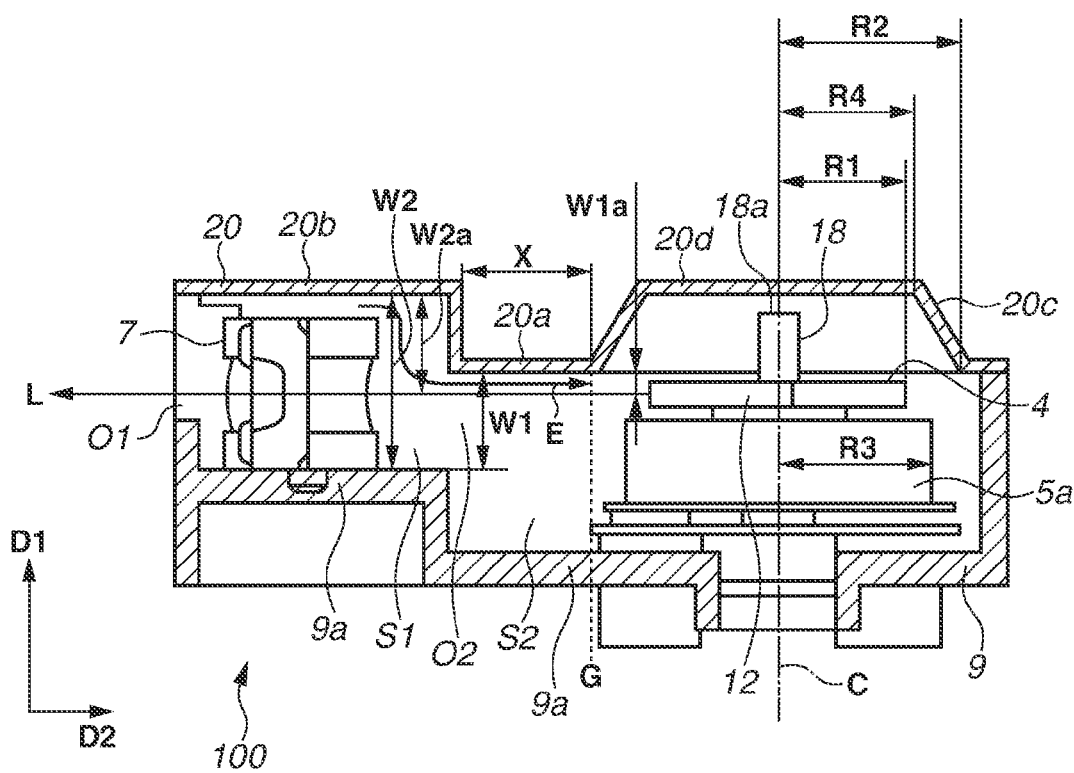
FIG. 4 is a cross-sectional view illustrating the optical scanning apparatus.

FIG. 4 illustrates a cross section of the optical scanning apparatus 100 taken along a broken line and seen from the direction of the arrows A illustrated in FIG. 3, which includes a rotation center C of the light deflector 5, in the state where the lid member 20 is assembled with the box member 9. In FIG. 4, D1 represents the axial direction parallel to the rotation center C of the rotational shaft 18 and D2 represents a direction perpendicular to the axial direction and directed from the aperture O1 to the rotary polygon mirror 4. The direction D2 is parallel to the centerline of the beam L illustrated in FIG. 4. Further, as apparent from the illustration, the lid member 20 is located higher (i.e., positioned at an upper side) and the bottom surface 9a of the box member 9 is located lower (i.e., positioned at a lower side) in the axial direction D1. The bottom surface 9a is in a confronting relationship with the lid member 20 and supports each optical member.

The convex portion 20c has a convex shape protruding in a departing direction, when seen from the bottom surface 9a of the box member 9 (i.e., in the direction away from the light deflector 5) in the axial direction D1. The counter portion 20d is a part of the convex portion 20c. As illustrated in FIG. 4, the peripheral part 20a is positioned between the counter portion 20d and the aperture O1. The peripheral part 20a of the lid member 20, which surrounds the light deflector 5, is positioned lower and adjacent to the reflection surface 12 of the polygon mirror 4. More specifically, the peripheral part 20a of the lid member 20 is positioned lower than a topmost portion 18a of the rotational shaft 18 of the light deflector 5 (i.e., an edge portion of the light deflector 5 positioned remotest from the bottom surface 9a in the axial direction D1). However, the peripheral part 20a of the lid member 20 is positioned higher than the reflection surface 12 of the polygon mirror 4, so that the beam L can be prevented from being blocked off by the peripheral part 20a even when the box member 9 or the lid member 20 is thermally deformed.

The aperture O1 is not closed or covered by a translucent shielding member. In other words, the aperture O1 is an opening through which the inside space of the optical box can be interconnected with the outside space. Therefore, when the polygon mirror 4 rotates, air flows into or out from the optical scanning apparatus 100 via the aperture O1 of the box member 9. As an example, the air flowing into the optical scanning apparatus 100 along a path indicated by an arrow E will be described in detail below. The inflow air having entered the optical box via the aperture O1 passes through a clearance between the lid member 20 and the fθ lens 7 and reaches the periphery of the polygon mirror 4 along the path indicated by the above-mentioned arrow E. A first space S1 is defined as a space between the remaining portion (i.e., the second surface) 20b and a partial region of the bottom surface 9a that faces the remaining portion 20b.

A second space S2 is defined as a space between the peripheral part 20a and a partial region of the bottom surface 9a that faces the peripheral part 20a. The path indicated by an arrow E is the path along which the air flows from the first space S1 to the second space S2 via an inflow aperture O2. The inflow air contains toner particles, paper powder, and dust. When the inflow air reaches the periphery of the polygon mirror 4, the aerial dust may adhere to the reflection surface 12 of the polygon mirror 4. If fine particles adhere to the polygon mirror 4, the reflection rate will significantly decrease in the adhesion region of the fine particles. Unevenness may occur in image density.

However, in the present exemplary embodiment, as illustrated in FIG. 4, the peripheral part 20a of the lid member 20 is positioned lower than the remaining portion 20b and disposed adjacent to the reflection surface 12 of the polygon mirror 4. Therefore, the amount of the inflow air that can reach the reflection surface 12 of the polygon mirror 4 along the arrow E beyond a dotted line G decreases. Decreasing the inflow air amount is effective to maintain the reflection surface 12 of the polygon mirror 4 in a clean state.

The above-mentioned mechanism will be described in detail below. When the polygon mirror 4 rotates, each joint portion of two neighboring reflection surfaces 12 of the polygon mirror 4 acts as a propeller that can generate a negative pressure in the periphery thereof. Therefore, the air is attracted toward the polygon mirror 4. A rotor portion 5a, which is a cylindrical portion having a radius R3, is provided at a lower side (i.e., at a bottom surface side) of the polygon mirror 4. The radius R3 is greater than a radius R1 of a circumscribed circle of the polygon mirror 4. Therefore, the amount of air attracted from the lower side of the polygon mirror 4 is very small. On the other hand, there is not any obstacle on the upper side of the polygon mirror 4, except for the rotational shaft 18 and a fastener (not illustrated) that firmly fixes the polygon mirror 4 to the rotational shaft 18. Therefore, the amount of air attracted from the upper side of the polygon mirror 4 is relatively large.

Therefore, the present exemplary embodiment employs a characteristic arrangement that extends in the direction from the aperture O1 to the rotary polygon mirror 4 (i.e., in the direction D2), in which the peripheral part 20a is positioned closer to the polygon mirror 4 than the remaining portion 20b in the axial direction D1. More specifically, the peripheral part 20a is disposed closer to the polygon mirror 4 than the remaining portion 20b in the axial direction D1 and is disposed closer to the bottom surface 9a than the edge portion 18a of the light deflector 5 positioned remotest from the bottom surface 9a in the axial direction D1. Therefore, a width W1a of a portion positioned on the upper side (i.e., a top surface side) than the beam L in the axial direction D1, which is a partial region of a width W1 of the inflow aperture O2, becomes less than a width W2a of a portion of the first space S1 positioned on the upper side (i.e., the top surface side) than the beam L, which is a partial region of a width W2 of a neighboring portion neighboring the inflow aperture O2 in the axial direction D1. Therefore, the air cannot smoothly flow into the upper side of the polygon mirror 4. The amount of air that will be attracted from the upper side of the polygon mirror 4 toward the polygon mirror 4 can be reduced. Further, the width W1 of the inflow aperture O2 in the axial direction D1 is smaller than the width W2 of the neighboring portion of the first space S1 that neighbors the inflow aperture O2 in the axial direction D1. Therefore, the air cannot smoothly flow into the second space S2 from the first space S1. Further, the peripheral part 20a is disposed around the counter portion 20d. Accordingly, the above-mentioned effects are not limited to the flow of air from the aperture O1 to the polygon mirror 4. For example, similar effects can be obtained when the air flows in a direction from a gap on the semiconductor laser unit 1 side or other opening sides to the polygon mirror 4. The top surface of the optical box is constituted by a single lid only.

Figure 5:
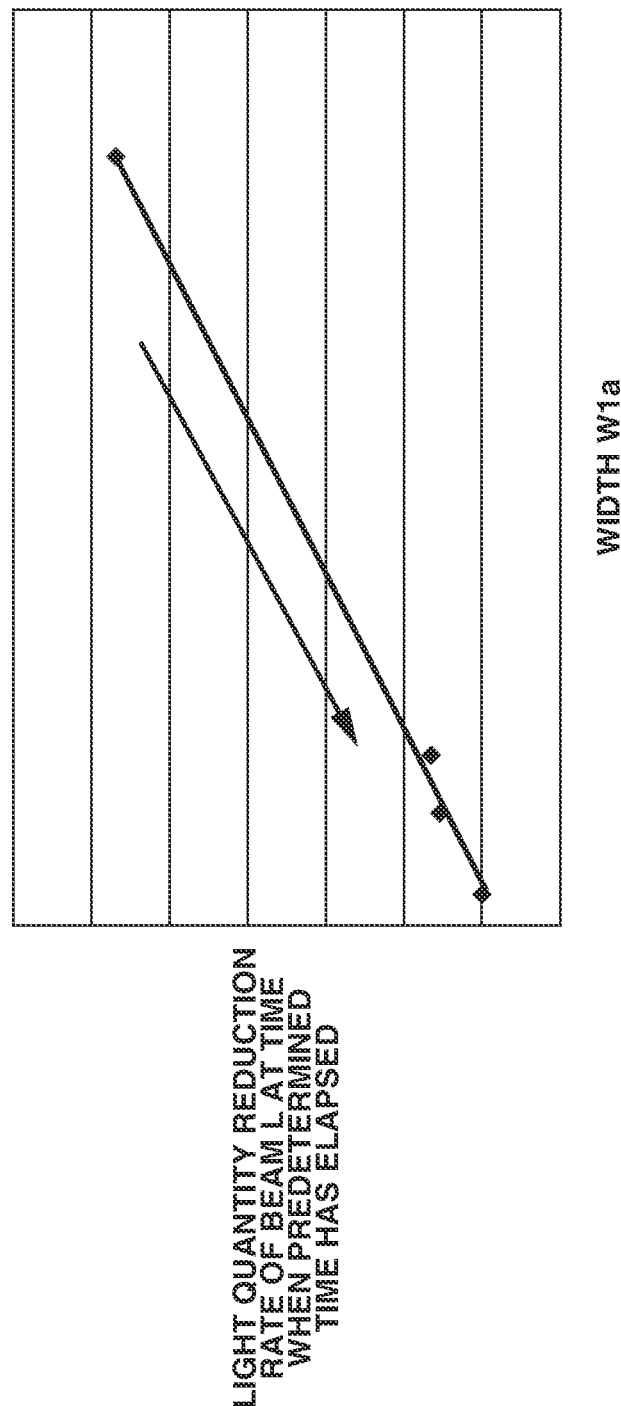
FIG. 5 is a graph illustrating light quantity reduction rate in relation to the distance from a predetermined portion of a lid to the beam.

FIG. 5 illustrates a light quantity reduction rate of the beam L emitted outside from the optical scanning apparatus 100, which is variable depending on the width W1a. As understood from FIG. 5, when the width W1a is smaller, the light quantity reduction rate of the beam L is smaller. More specifically, when the width W1a is smaller, the amount of inflow air that can reach the reflection surface 12 is smaller. The reflection rate can be suppressed from decreasing due to uncleanness of the reflection surface 12. Therefore, it is desired that the value W1a is sufficiently smaller. However, as mentioned above, even when the box member 9 or the lid member 20 is thermally deformed, it is necessary to prevent the beam L from being blocked off by the deformed member. In view of the foregoing, it is desired that the width W1a is in a range from 2 mm to 3 mm.

Figure 6:
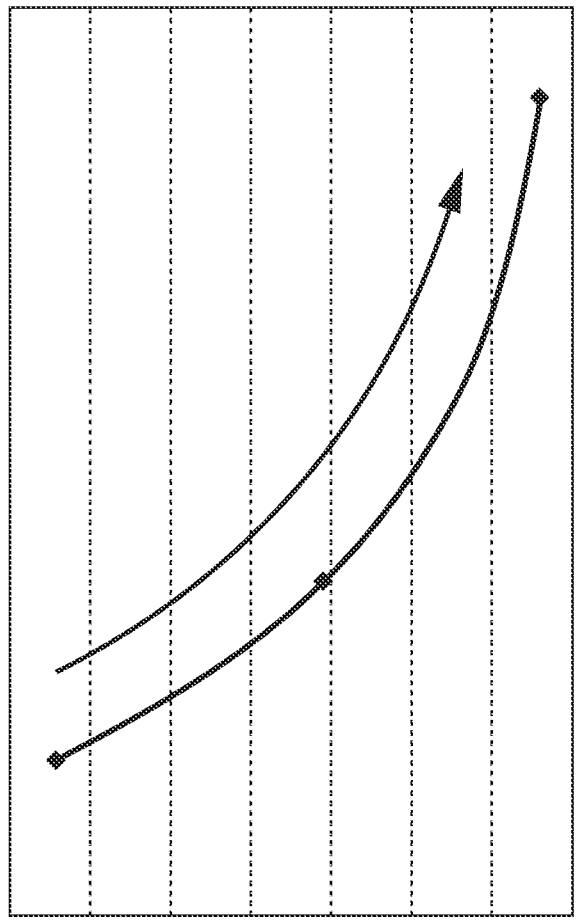
FIG. 6 is a graph illustrating light quantity reduction rate in relation to the width of the predetermined portion of the lid.

FIG. 6 illustrates the light quantity reduction rate of the beam L that is variable depending on a width X of the peripheral part 20a in a direction perpendicular to the axial direction D1 (i.e., the reflection direction of the beam L on the reflection surface 12). As understood from FIG. 6, when the width X is larger, the light quantity reduction rate of the beam L is smaller. More specifically, when the width X is greater, the amount of inflow air that can reach the reflection surface 12 is smaller. The reflection rate can be suppressed from decreasing due to uncleanness of the reflection surface 12. The examination by the inventor reveals that, if the width X is equal to or less than 15 mm, the reduction in reflection rate due to uncleanness of the reflection surface 12 can be sufficiently suppressed.

Figure 7:
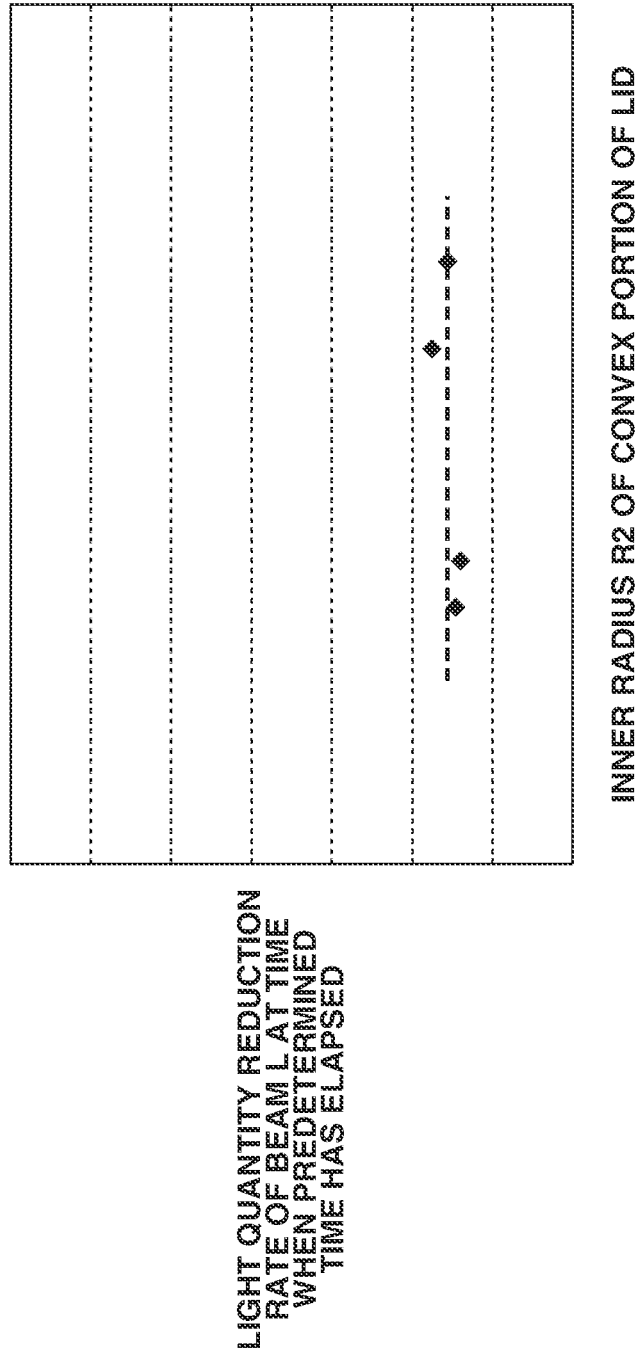
FIG. 7 is a graph illustrating light quantity reduction rate in relation to the radius of a convex portion of the lid.
Figure 8:
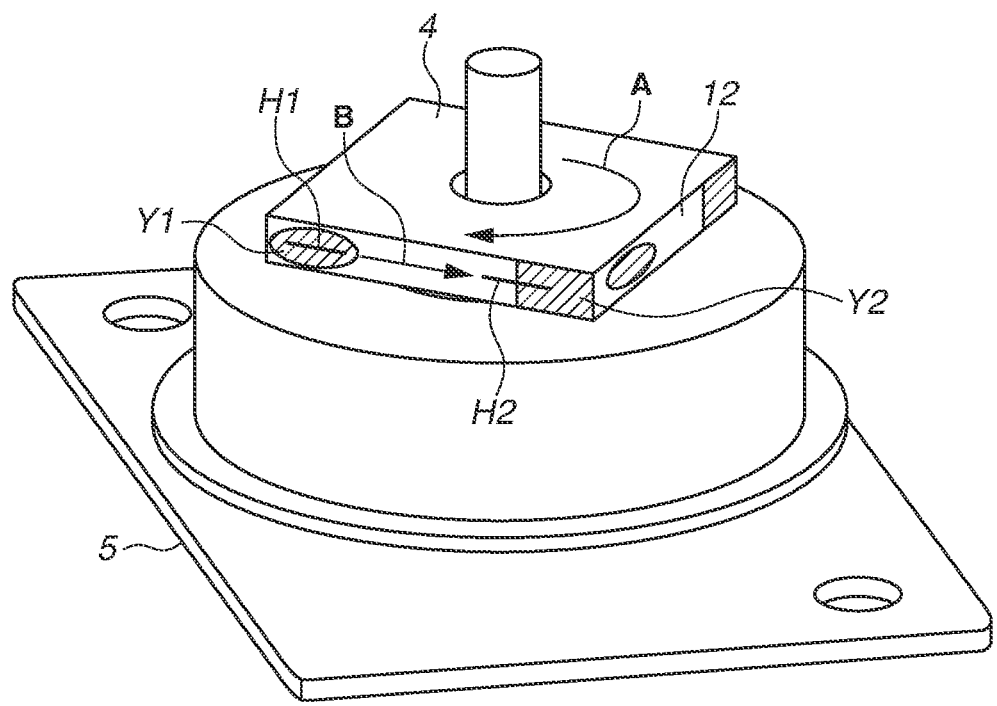
FIG. 8 schematically illustrates a stain on a polygon mirror.

FIG. 7 illustrates the light quantity reduction rate of the beam L in relation to a radius R2 of a lower edge portion of the convex portion 20c of the lid member 20, when the width X is 15 mm. If the width X is large enough, the size of the radius R2 has no substantial influence on the degree of uncleanness of the polygon mirror 4. Therefore, in the present exemplary embodiment, the radius R2 is set to be greater than the radius R1 of the circumscribed circle of the polygon mirror 4. The above-mentioned size setting is effective to prevent the lid member 20 from contacting the rotational shaft 18 of the light deflector 5 or the polygon mirror 4 when the lid member 20 is assembled with the box member 9. Further, when an impact force is applied to the optical scanning apparatus 100 in the up-and-down direction, the peripheral part 20a of the lid member 20 can be prevented from contacting the polygon mirror 4 as long as the relationship R2>R1 is satisfied. Further, it is desired that the radius R2 of the lower edge portion of the convex portion 20c is set to be greater than a radius R4 of the third surface 20d. Further, it is desired that the radius R4 of the third surface 20d is set to be greater than the radius R1 of the circumscribed circle of the polygon mirror 4.

As mentioned above, the peripheral part 20a is disposed closer to the polygon mirror 4 than the remaining portion 20b in the axial direction D1 and is positioned closer to the bottom surface 9a than the edge portion 18a of the light deflector 5 positioned remotest from the bottom surface 9a in the axial direction D1. Accordingly, the amount of air that flows into the optical scanning apparatus 100 from the outside and reaches the polygon mirror 4 can be reduced. The cleanness of the polygon mirror 4 can be maintained appropriately. The unevenness can be prevented from occurring in image density.

The optical scanning apparatus 100 according to present exemplary embodiment exposes only one photosensitive drum 8a. However, the above-mentioned configuration is applicable to an optical scanning apparatus that is configured to expose a plurality of photosensitive drums.

According to the present invention, it is feasible to prevent fine particles from adhering to a polygon mirror surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-028946, filed Feb. 17, 2015, which is hereby incorporated by reference herein in its entirety.

What is claimed is:

1. An optical scanning apparatus comprising:
   a light deflector that includes a rotary polygon mirror and is configured to deflect a light beam emitted from a light source; and
   an optical box that includes a bottom surface that supports the light deflector and a top surface that faces the bottom surface, wherein the optical box includes an aperture through which the light beam reflected by the light deflector can be emitted;
   wherein the top surface of the optical box is constituted by a single lid, and the top surface includes a first surface and a second surface provided at different positions in a direction from the aperture to the rotary polygon mirror,
   wherein the first surface is disposed closer to the rotary polygon mirror than the second surface in the direction directed from the aperture to the rotary polygon mirror,
   wherein the first surface is disposed closer to the rotary polygon mirror than the second surface in a rotation axis direction of the rotary polygon mirror and is disposed closer to the bottom surface than an edge portion of the light deflector positioned farthest from the bottom surface,
   wherein the top surface of the optical box includes a convex portion that is provided at the same position as the rotary polygon mirror in the direction from the aperture to the rotary polygon mirror in such a way as to protrude in a direction away from the bottom surface in the rotation axis direction of the rotary polygon mirror,
   wherein a third surface of the convex portion located at a remotest position from the bottom surface is positioned farther from the bottom surface than the first surface in the rotation axis direction of the rotary polygon mirror, and
   wherein a lower edge portion of the convex portion that is adjacent to the rotary polygon mirror is disposed outside a circumscribed circle of the rotary polygon mirror.

2. The optical scanning apparatus according to claim 1, wherein the optical box includes an inflow aperture through which air can pass through when the air moves from a first space between the second surface and a portion of the bottom surface that faces the second surface to a second space between the first surface and a portion of the bottom surface that faces the first surface, and a width W1a is less than a width W2$a$, in which W1 represents the width of the inflow aperture in the rotation axis direction, W1$a$ represents the width of a partial region of the width W1 located on a top surface side above light reflected by the rotary polygon mirror, W2 represents the width of a portion of the first space neighboring the inflow aperture in the rotation axis direction, and W2$a$ represents the width of a partial region of the width W2 located on the top surface side above the light reflected by the rotary polygon mirror.

3. The optical scanning apparatus according to claim 2, wherein the width W1 is less than the width W2.

4. The optical scanning apparatus according to claim 1, wherein the first surface is provided around the third surface.

5. The optical scanning apparatus according to claim 1, wherein the light deflector includes a cylindrical portion disposed on a bottom surface side of the rotary polygon mirror, and the radius of the cylindrical portion having a center coinciding with a rotation axis of the rotary polygon mirror is greater than the radius of the circumscribed circle of the rotary polygon mirror.

6. The optical scanning apparatus according to claim 1, wherein the radius of the lower edge portion of the convex portion is greater than the radius of the third surface.

7. The optical scanning apparatus according to claim 6, wherein the radius of the third surface is greater than the radius of the circumscribed circle of the rotary polygon mirror.

* * * * *